(12) United States Patent
Gallet

(10) Patent No.: US 8,272,833 B2
(45) Date of Patent: Sep. 25, 2012

(54) TURBOPROP WITH A VARIABLE-PITCH PROPELLER

(75) Inventor: Francois Gallet, Paris (FR)

(73) Assignee: SNECMA, Paris (FR)

( * ) Notice: Subject to any disclaimer, the term of this patent is extended or adjusted under 35 U.S.C. 154(b) by 1281 days.

(21) Appl. No.: 12/019,155

(22) Filed: Jan. 24, 2008

(65) Prior Publication Data

US 2008/0179455 A1    Jul. 31, 2008

(30) Foreign Application Priority Data

Jan. 26, 2007   (FR) ..................... 07 52910

(51) Int. Cl.
*F01D 7/00*   (2006.01)
(52) U.S. Cl. .............. 415/69; 415/65; 415/68; 416/122; 416/126; 416/129; 416/130; 416/160
(58) Field of Classification Search ............ 415/65, 415/66, 68, 69; 416/122, 124, 126–130, 416/147, 159, 160
See application file for complete search history.

(56) References Cited

U.S. PATENT DOCUMENTS

| 2,394,299 | A | | 2/1946 | Friedrich | |
|---|---|---|---|---|---|
| 5,156,648 | A | * | 10/1992 | Hora | 416/160 |
| 5,174,716 | A | * | 12/1992 | Hora et al. | 416/26 |
| 5,242,265 | A | * | 9/1993 | Hora et al. | 416/26 |
| 5,795,200 | A | * | 8/1998 | Larkin | 440/81 |

FOREIGN PATENT DOCUMENTS

| FR | 887.543 | 11/1943 |
|---|---|---|
| FR | 891.706 | 3/1944 |
| FR | 998.574 | 1/1952 |
| GB | 544948 | 5/1942 |

OTHER PUBLICATIONS

U.S. Appl. No. 11/937,168, filed Nov. 8, 2007, Gallet.
U.S. Appl. No. 12/017,566, filed Jan. 22, 2008, Gallet.

* cited by examiner

*Primary Examiner* — Christopher Verdier
(74) *Attorney, Agent, or Firm* — Oblon, Spivak, McClelland, Maier & Neustadt, L.L.P.

(57) ABSTRACT

A turboprop having at least one propeller formed by a set of variable pitch blades. Each blade is swivel-mounted on a rotary support and carries a gearwheel meshing with an actuator annulus rotating on the rotary support and coupled to a control annulus via an epicyclic mechanism.

4 Claims, 2 Drawing Sheets

TURBOPROP WITH A VARIABLE-PITCH PROPELLER

The present invention relates to a turboprop with variable-pitch type propellers in which each propeller comprises a set of blades of controlled variable-pitch. Varying the pitch of the blades constitutes one of the parameters used for controlling the thrust of the turboprop. The invention relates to a mechanism for controlling the pitch of said blades.

BACKGROUND OF THE INVENTION

A turboprop of the above-mentioned type needs to include a system for adjusting the pitch of the blades so as to be capable at all times of adapting the power of the engine to its conditions of use. In the past, systems for controlling blade pitch have been proposed in which control elements are arranged on the axis of the engine, i.e. more particularly in the central space of the annular turbine driving the blades. In most conventional manner, the turbine is of the type having two contrarotating free rotors and each rotor is connected to a rotary support on which the blades of the two propellers are installed.

The two rotary supports are thus contrarotating supports that are axially offset along a common axis, and when the blade pitch control means are situated in the vicinity of the turbine axis, it is necessary to provide an intermediate mechanical device for controlling the pitch of the blades through the rotors of the turbine. That mechanism is heavy, expensive, and difficult to maintain.

OBJECTS AND SUMMARY OF THE INVENTION

The invention makes it possible to limit those drawbacks by replacing such internal mechanical control by mechanical control that is arranged essentially on the outside of the engine, between the stationary casing of the turboprop and the rotary support(s).

More particularly, the invention provides a turboprop comprising at least one propeller formed by a set of blades secured to a first annular rotary support mounted to rotate about an engine axis and adjacent to an outer stationary casing housing a turbine having a rotor driving said first rotary support, each blade of said set being mounted on a pin to swivel relative to said first rotary support, wherein each blade pin carrying a gearwheel meshing with a first actuator annulus forming a toothed wheel and mounted to be capable of rotating about said engine axis on said rotary support, and wherein the actuator annulus being coupled to a first external control annulus coaxial about said first rotary support, via a first epicyclic mechanism carried by said first rotary support.

In one possible embodiment, said first epicyclic mechanism includes a planet-carrier ring mounted to be capable of rotating on said first rotary support. The planet-carrier ring carries two groups of planet gearwheels that are of identical dimensions (e.g., for each group, at least three gearwheels that are circumferentially offset from one another about the engine axis). The gearwheels of a first group are interposed between a toothed ring of the first rotary support and a toothed ring of the stationary casing. The gearwheels of a second group are interposed between a toothed ring of said first actuator annulus and a toothed ring of said first control annulus.

It is remarkable that all of the above-mentioned elements are arranged at the outside, most of them on said rotary support.

It is relatively easy to provide actuator means (actuators, electric motors, . . . ) between the control annulus and the stationary casing of the turboprop. Moving such actuator means acts on the entire mechanism and leads to the pitch of the blades being varied.

In the conventional configuration where the turboprop is fitted with two propellers carried respectively by first and second annular rotary supports driven in opposite directions to each other, the blades carried by said second rotary support are actuated by a comparable arrangement comprising a second epicyclic mechanism carried by said second rotary support.

More precisely, a second actuator annulus forming a toothed wheel is mounted to be capable of rotating on said second rotary support and said second actuator annulus is coupled via said second epicyclic mechanism to a second control annulus coaxial about the second rotary support.

Advantageously, said second control annulus comprises a toothed ring meshing with gearwheels of blades carried by said first rotary support.

As mentioned above, said second epicyclic mechanism is identical to the first, but the planet gearwheels of an above-mentioned first group are interposed between a toothed ring of the second rotary support and a toothed ring of said first rotary support.

BRIEF DESCRIPTION OF THE DRAWINGS

The invention can be better understood and other advantages thereof appear better in the light of the following description of a turboprop in accordance with the principle of the invention, given purely by way of example and made with reference to the accompanying drawings, in which.

MORE DETAILED DESCRIPTION

Figure 1:
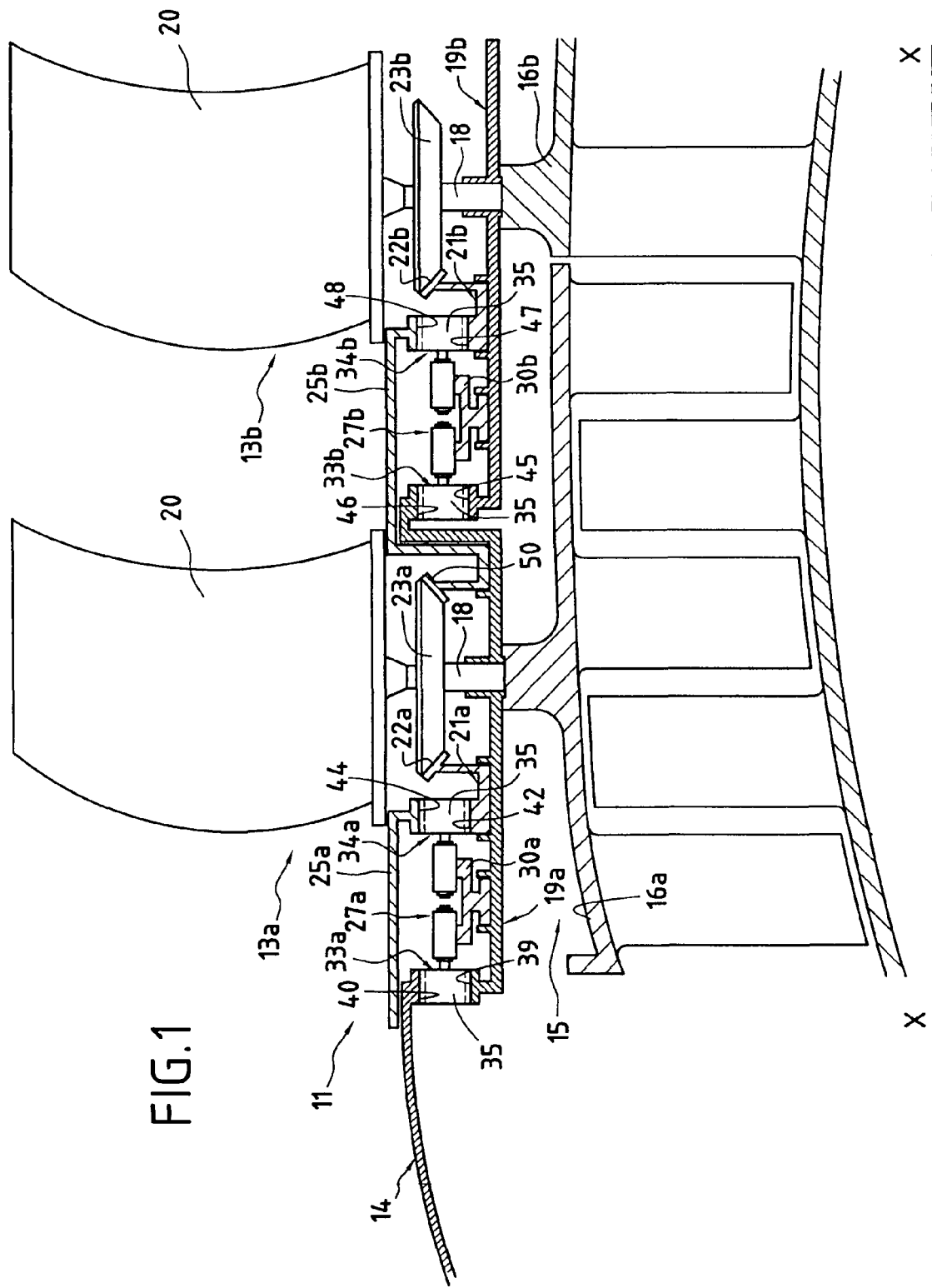
FIG. 1 is a fragmentary diagrammatic half-section of a turboprop in accordance with the invention.
Figure 2:
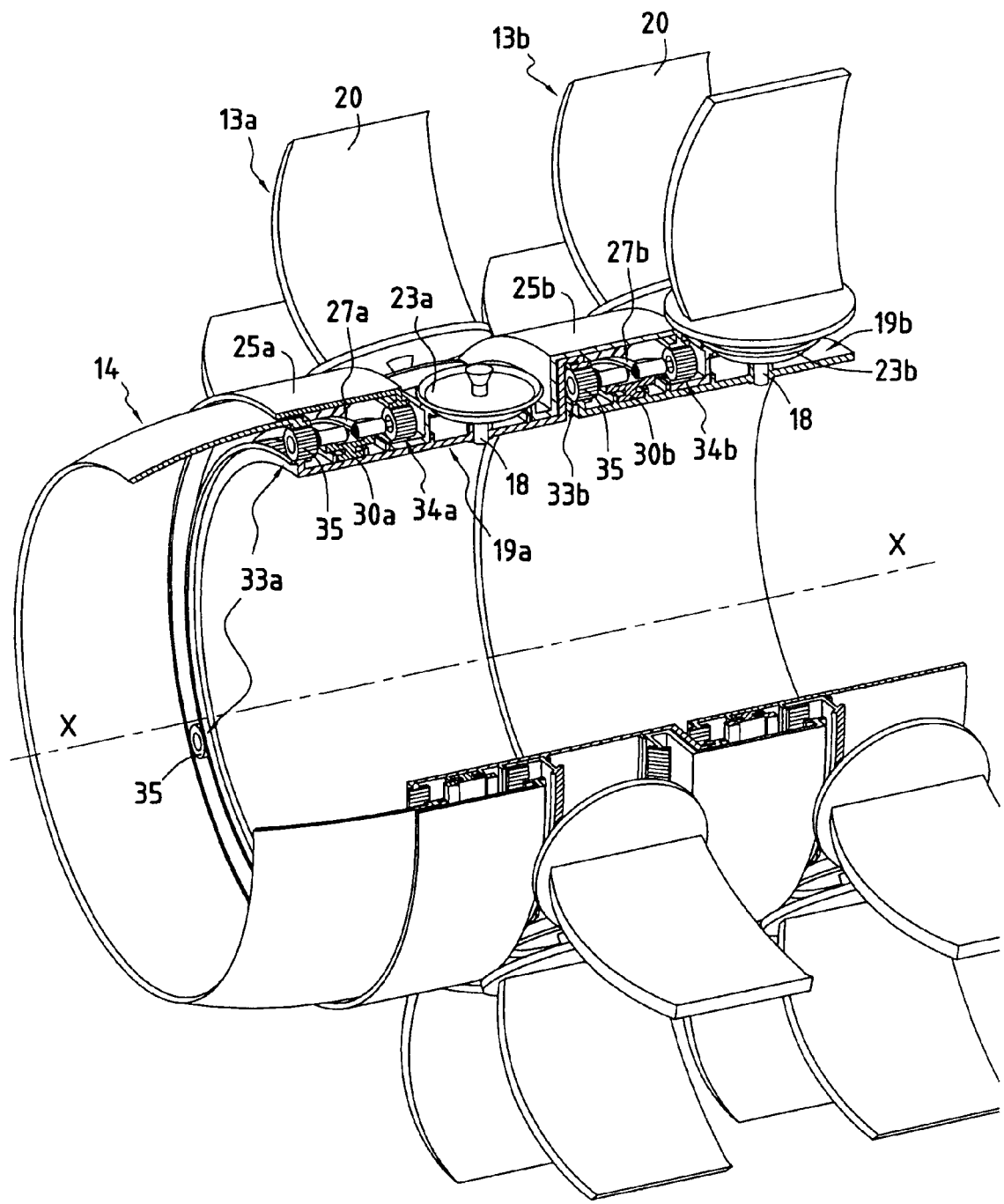
FIG. 2 is a fragmentary diagrammatic view in perspective of the outside portion of the same turboprop, the turbine being omitted.

In the drawings, there can be seen a portion of a turboprop 11 having two propellers 13a, 13b. The portions shown more particularly are the stationary outer casing 14 of the turboprop, a free turbine 15 having two contrarotating rotors 16a, 16b installed inside the casing 14, and two annular rotary supports 19a, 19b respectively carried by the rotors 16a and 16b.

The propellers 13a, 13b are installed respectively on the rotary supports 19a, 19b, each propeller being constituted by a set of blades 20. Each blade is pivotally mounted on the corresponding rotary support, to swivel about an axis extending radially relative to the axis of rotation X-X of the turboprop.

The two rotary supports 19a, 19b are installed axially in line with each other, and at substantially the same level as the stationary outer casing 14. In the example shown, said first rotary support is the support nearer to the front of the turboprop.

Said first rotary support 19a, constrained to rotate with the rotor 16a and arranged on the outside thereof, carries an actuator annulus 21a including a toothed wheel 22a mounted to be capable of turning about the axis X-X on said first rotary support 19a. Furthermore, each blade pin has a gearwheel 23a meshing with the toothed wheel 22a of the actuator annulus 21a. The actuator annulus 21a is moved by the external control annulus 25a (mounted coaxially about said first rotary support 19a) via a first epicyclic mechanism 27a carried by said first rotary support.

More precisely, the first epicyclic mechanism 27a comprises a planet-carrier ring 30a mounted to be able to rotate about the axis X-X on said first rotary support, and said planet-carrier ring carries two groups 33a, 34a of planet gearwheels 35. For example, each group comprises three gearwheels 35 that are circumferentially offset relative to one another. Under such circumstances, the gearwheels are angularly offset by 120° about that axis X-X. The gearwheels 35 of a first group 33a are interposed between a toothed ring 39 of the first rotary support and a toothed ring 40 of the stationary casing 14. The gearwheels of the second group 34a are interposed between a toothed ring 42 of the first actuator annulus 21a and a toothed ring 44 of the first control annulus 25a.

Actuator means (not shown) may be arranged between the control annulus 25a and the stationary casing 14 of the turboprop. As explained below, causing the control annulus to move changes the speeds of the epicyclic mechanisms, and thus causes the blades to swivel about their pins 18.

The second rotary support 19b is constrained to rotate with the second rotor 16b of the turbine. It is driven in the opposite direction to the first rotary support. The blades 20b carried by the second rotary support are actuated by a comparable arrangement, comprising a second epicyclic mechanism carried by said second rotary support 19b.

More precisely, there can be seen a second actuator annulus 21b forming a toothed wheel 22b that is mounted to be capable of turning on said second rotary support 19b. The toothed wheel 22b meshes with gearwheels 23b carried by the pins 18 of the blades 20 of the propeller 13b. The second actuator annulus 21b is coupled to a second control annulus 25b coaxial about said second rotary support 19b by means of a second epicyclic mechanism 27b. This control annulus 25b is caused to move (relative to the casing 19b) by rotation of the gearwheel 23a.

Said second epicyclic mechanism 27b is identical to the first. It has a planet-carrier ring 30b mounted with the ability to rotate on said first rotary support. This planet-carrier ring carries two groups 33b, 34b of planet gearwheels 35. The gearwheels of the first group are interposed between a toothed ring 45 of said second rotary support 19b and a toothed ring 46 carried by said first rotary support 19a. The gearwheels of the second group are interposed between a toothed ring 47 of said second actuator annulus 21b and a toothed ring 48 of said second control annulus 25b. The second control annulus 25b has a toothed ring 50 engaging the gearwheels 23a of the blades carried by said first rotary support.

Operation is as follows.

With reference to the propeller 13a and the first rotary support 19a, it is clear that the first rotary support rotates relative to the casing 14 at the speed imparted thereto by the rotor 16a. The gearwheels 35 of the first group 33a are subjected to epicyclic motion (i.e. made up of rotation about their own axes together with rotation about the engine axis). This motion entrains rotation of the planet-carrier ring 30a about the engine axis. As it moves, the planet carrier entrains the second planet group 34a. The gearwheels therein are consequently subjected to epicyclic movement.

If the control annulus 25a is held in a stationary and predetermined position, i.e. if it does not turn relative to the stationary casing 14, then the motion of the planet gearwheels in the second group is identical to that of the planet gearwheels of the first group (since they have the same dimensions and since the rings have the same radii and are on the same axis and (on this assumption) stationary, they consequently have the same speeds of rotation). Thus, the rotary support 19a and the annulus 21a rotate at the same speed about the engine axis; there is no relative movement between them. Thus, the position of the blades 20 is stationary relative to the rotary support and therefore remains stable. In contrast, if said first control annulus 25a is caused to turn relative to the casing 14, the movements of the rotary support and of the actuator annulus differ (their speeds of rotation about the engine axis are no longer identical), thereby causing the pins 18 to turn and consequently varying the pitch of the blades 20.

Operation is identical for the propeller 13b where the blades 20 are swiveled under the control of the second actuator annulus 21b itself driven by changing the pitch of the blades of the first propeller 13a, via the interposed second epicyclic mechanism 27b carried by said rotary support 19b.

What is claimed is:

1. A turboprop comprising at least one propeller formed by a set of blades secured to a first annular rotary support mounted to rotate about an engine axis X-X and adjacent to an outer stationary casing housing a turbine having a rotor driving said first rotary support, each blade of said set being mounted on a pin to swivel relative to said first rotary support, each blade pin carrying a gearwheel meshing with a first actuator annulus forming a toothed wheel and mounted to be capable of rotating about said engine axis on said rotary support, and the actuator annulus being coupled to a first external control annulus coaxial about said first rotary support, via a first epicyclic mechanism carried by said first rotary support, wherein said first epicyclic mechanism carries a planet-carrier ring mounted to be capable of rotating on said first rotary support, and wherein said ring carries two groups of planet gearwheels, the gearwheels of the first group being interposed between a toothed ring of the first rotary support and a toothed ring of the stationary casing, and the gearwheels of a second group being interposed between a toothed ring of said first actuator annulus and a toothed ring of said first control annulus.

2. A turboprop according to claim 1, including a second annular rotary support rotatable in the opposite direction to said first rotary support and carrying a second set of blades, each blade being swivel-mounted on said second rotary support, wherein each blade pin carried by said second rotary support is engaged by meshing with a second actuator annulus forming a toothed wheel mounted to be capable of rotating on said second rotary support, and wherein said second actuator annulus is coupled to a second control annulus coaxial about said second rotary support via a second epicyclic mechanism carried by said second rotary support.

3. A turboprop according to claim 2, wherein said second control annulus comprises a toothed ring meshing with gearwheels of blades carried by said first rotary support.

4. A turboprop according to claim 2, wherein said second epicyclic mechanism comprises a planet-carrier ring mounted to be capable of rotating on said second rotary support and carrying two groups of planet gearwheels, the planet gearwheels of a first group being interposed between a toothed ring of said second rotary support and a toothed ring of said first rotary support, and the planet gearwheels of a second group being interposed between a toothed ring of said second actuator annulus and a toothed ring of said second control annulus.

* * * * *